Dec. 23, 1958 W. P. LEAR ET AL 2,865,205
TORSIONALLY DEFORMABLE SUPPORT FOR A GYROSCOPE GIMBAL
Original Filed Oct. 23, 1951
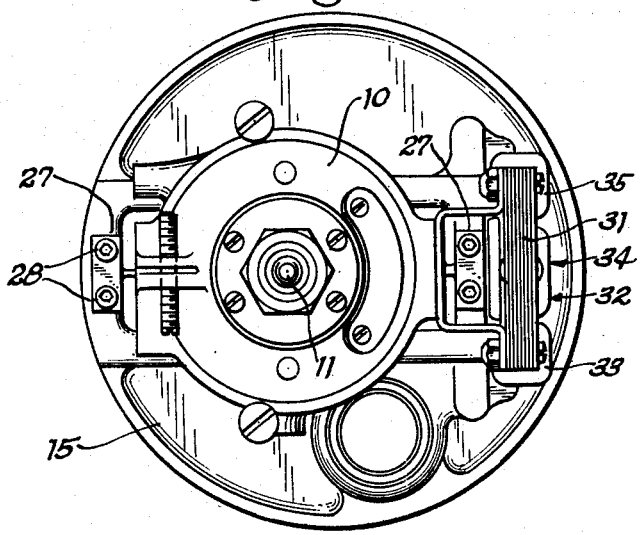
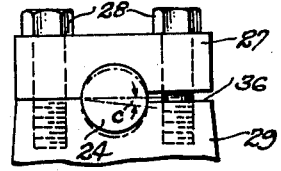
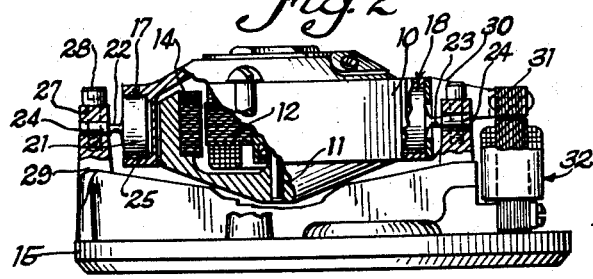
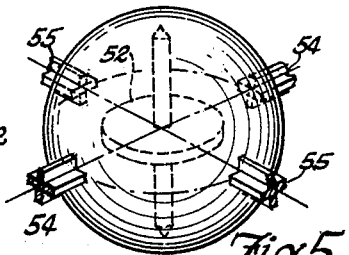
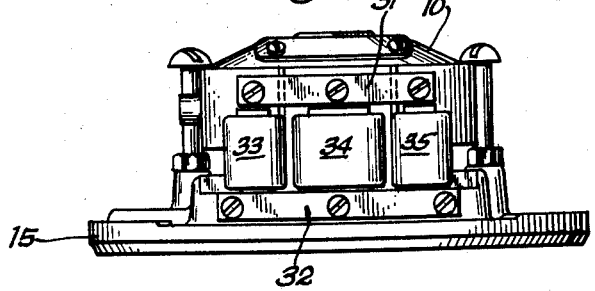
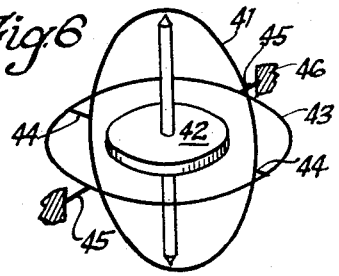
INVENTORS:
William P. Lear and
Thomas Barish
BY
Leonard S. Knox
Attorney

United States Patent Office 2,865,205
Patented Dec. 23, 1958

2,865,205

TORSIONALLY DEFORMABLE SUPPORT FOR A GYROSCOPE GIMBAL

William P. Lear, Pacific Palisades, Calif., and Thomas Barish, Cleveland, Ohio, assignors to Lear, Incorporated Original application October 23, 1951, Serial No. 252,736, now Patent No. 2,720,569, dated October 11, 1955. Divided and this application May 10, 1957, Serial No. 658,367

3 Claims. (Cl. 74—5)

This invention relates to a mounting for a gyroscope gimbal. More specifically it has relation to a gyroscope in which one or more of the gimbals is restricted in angular displacement to extremely small angles.

An example of gyroscope with which the invention may be incorporated is the so-called rate gyroscope utilized principally in aerial navigation and cooperable with a vertical gyroscope in a manner to be explained. When utilizing an automatic pilot which depends in part upon a single vertical gyroscope for translating errors in pitch and roll into a voltage forming an input signal to the amplifiers driving the surface-controlling servo motors the vertical gyroscope is, in most modern instruments, maintained to true vertical by means of a gravity-responsive variable resistance device, sometimes called an electrolytic switch. Such device contains a plurality of electrodes and an electrically conductive fluid defining a bubble with the switch casing. The conductivity of a circuit including the varying resistance of the fluid in its relation to the electrodes is influenced in accordance with the position of the bubble, i. e. the position of the device. For a typical device of this character reference may be had to U. S. Letters Patent No. 2,720,569, granted October 11, 1955. The circuit is also connected to a source of power and to torque motors arranged to maintain the gyroscope to the reference vertical by driving the gimbal thereof.

When going into a turn it becomes necessary to eliminate erection of the gyroscope insofar as concerns the roll axis of the airplane, for otherwise the gyroscope will be erected to true vertical, which is no longer in the fore and aft plane of the aircraft and, by such false erection, errors in autopilot function ensue.

To avoid such mis-function the "roll" electrodes of the electrolytic switch are cut out during a turn by the use of a rate gyroscope. This instrument comprises a housing (gimbal) supporting a gyroscope rotor; the housing being rotatably supported on a frame secured to the aircraft in such position that the gyroscope will be precessed by the centrifugal force corresponding to the given rate of turn to which the aircraft is then subjected and, by means of a suitable pickoff incorporated between the housing and the frame, will provide a signal which contains a rate component of such magnitude and phase as to effect opening of the roll erection circuit.

However, the rate gyroscope should not be suspended so freely as to sense all random displacements of the airplane on its roll axis, since under those circumstances the gyroscope will be effective to open and close the roll erection circuit in compliance with every such displacement and thereby result in erratic performance of the autopilot system. On the other hand a sustained displacement above a minimum predetermined norm and occurring about the roll axis, as would be the case in a turn, should be effective to cut out roll erection during the turn, and to re-establish the circuit upon resumption of level flight.

Accordingly we have found that the system for suspending the single gimbal, i. e. housing, of the rate gyroscope must possess a degree of rigidity which will render the gimbal relatively unresponsive to minor fluctuations of the aircraft on its roll axis, but will allow a sensible displacement thereof for such rate of turn as would cause false erection of the gyroscope and accordingly disable the roll erection circuitry.

In view of the foregoing a principal object of our invention is to provide in a rate gyroscope semi-rigid means for mounting the rotor gimbal for permitting a limited degree of angular displacement thereof.

A further object is to provide mounting means as aforesaid which includes a torsionally deformable element.

Still a further object is to provide means as aforesaid which is adaptable to mounting a gimbal within a gimbal, with or without pickoffs associated with either gimbal.

Another object resides in providing torsionally bi-directionally deformable elements as the rotational support for a gyroscope gimbal, in order that movement of the gimbal on its axis may occur in either sense against the same amount of resilient opposing force.

Still another object is to provide a semi-rigid mounting for the gimbal of a gyroscope which, while permitting proper displacement of the gimbal in response to change in attitude of the craft, provides suitable protection against misadjustment in the pickoff due to shock.

Another object is to provide a support for the purpose pointed out which is rotationally deformable but substantially non-deformable when subjected to radially applied forces.

Other objects will appear from the following description, taken with the appended drawing, in which latter:

Fig. 1 shows a top plan view of a rate gyroscope embodying the invention;

Fig. 2 shows a front elevational view thereof partly sectioned;

Fig. 3 shows a right side-elevational view thereof;

Fig. 4 shows a somewhat magnified detail of the adjusting means for the armature of the pickoff; and Figs. 5 and 6 are perspective, diagrammatic views of the mounting member of the invention in other typical applications.

Broadly regarded the invention improvement contemplates the securement intermediate the fixed framework of the instrument and the rotor housing, i. e. gimbal, of one or more elements which possess predetermined torsional resiliency but no perceptible lateral deflection under the loads encountered and which element serves to support one gimbal on another gimbal or on a fixed support. Preferably the supporting members, if more than one is employed, are of similar construction, and include a portion intermediate the ends so designed as to permit limited torsional deformation of the member about an axis corresponding to what may be termed the principal rotational axis of the gimbal such axis, in the case of a gimbal carried on a fixed framework, lying in a plane including the axis of the rotor and perpendicular to said latter axis. However, lateral deflection of the support member is maintained at an absolute minimum consistent with the desired torsional characteristic, thus providing radial support for the gimbal and the elements carried thereby. In a subsidiary aspect, when an E–I pickoff is employed for translating the angular displacement of the gyroscope into an electrical signal having a magnitude and phase corresponding to the magnitude and direction of the angular displacement it has been found desirable to provide that the supporting member adjacent the pickoff be stiffer than the opposite member. In this way the possibility of disturbing the initial, critical adjustment of the pickoff is materially reduced.

In another aspect the invention contemplates securement of the supporting members to the frame by means of a clamping arrangement so constructed that by tightening or loosening a clamping screw micrometric angular displacement of the supporting member may be effected, and the null position of the pickoff rapidly and accurately achieved.

Where, in this description and the claims, we refer to the supporting members as laterally rigid, we intend to mean that the gyroscope gimbal and the parts carried thereby are substantially restrained from angular displacement in any direction which is not tantamount to rotation about the axis of the supporting members, since such other displacement is without significance in connection with a gyroscope having only one degree of freedom, and may provide spurious indications by precessive effects. However, in this connection it is not intended to limit the scope of the invention to one-gimbal instruments, since the same is capable of being embodied in gimbal mountings generally. And, when we use the phrase "torsionally deformable," we intend to refer to a member which possesses a predetermined capacity to be twisted about its longitudinal axis, and incorporating sufficient elasticity to be self-restoring to an initial position. It will be understood that the design is such that under all working conditions of the instrument the elastic limit of the material is not exceeded.

Referring to the drawings a gimbal in the form of a housing 10 is provided with bearings 11—11 for supporting the rotor 12 of the gyroscope. In the chosen example the rotor is arranged as the armature of an electric motor, the stator being indicated at 14. It will be understood that other motive means may be employed, e. g. compressed air.

For supporting the gimbal 10 on the base or framework 15 there is provided a pair of laterally rigid but torsionally deformable members 17 and 18 (see Fig. 5), each comprising an inner head portion 21, desirably cylindrical, and hereinafter for convenience referred to as a flange, a neck 22 and 23 and an outer head 24, also desirably cylindrical.

Each flange 21 is press-fitted into a suitable recess 25 in each side of the housing 10, these being the same and disposed at each end of an axis intersecting the axis of the rotor 12 and perpendicular thereto. Each head 24 (Fig. 4) is rigidly clamped by means of a bar 27 and screws 28—28 to a post 29 upstanding from the framework 15, and which will be further described hereinafter.

Members 17 and 18 are of one-piece construction, preferably chrome-vanadium steel, e. g. SAE 6150, and thus capable of being heat treated to provide the desired resiliency in torsion together with stiffness under lateral deflection. Inasmuch as the preferred form of pickoff used for translating the deviation of the gyroscope into an electrical signal is extremely sensitive to relatively small angular movements of the gimbal, the gimbal supports may be made sufficiently rigid as to have a natural frequency of vibration well above those frequencies which are likely to be encountered. Furthermore the bending deflection must be kept as small as possible. Accordingly, the problem becomes one of providing a support member which is comparatively short in its active portion while possessed of that degree of torsional deformability which will provide a sufficient output signal from the pickoff.

Additionally the support members of the invention exert a centering action upon the gimbal, i. e. any influence tending to displace the gimbal in a lateral sense is counteracted by the spring action. However, to provide such response the spring cannot be too long.

Preferably the torsionally deformable portion, i. e. the neck 22 or 23, is made of cruciform transverse cross section as shown in Fig. 5. Although illustrated as comprising two interdigitated or otherwise integrated mutually perpendicular flat parts united with the mounting flanges and heads the same may be conveniently fabricated by milling grooves of quadrantal transverse cross-section longitudinally of a cylindrical blank. In any event a cruciform transverse cross section of predetermined effective length is provided, the spring constant whereof is made to provide the desired response when the member is torsionally deflected.

While any suitable pickoff may be employed for converting the angular displacement of the gyroscope into a controlling impulse, we prefer to utilize an E–I pickoff comprising an armature 31 carried on a bracket 30 attached to the housing 10, and a stator 32 including the windings 33, 34, and 35. Inasmuch as the principles of operation of a pickoff of this type are well known, no elaboration thereof will be given beyond stating that angular movement of the armature is effective to vary the magnitude of the flux threading the core at a rate depending upon the angular velocity of displacement of the gimbal. And, depending upon whether rotation of the armature is clockwise or counterclockwise, the output will be greater from one of the coils 33 or 35 than from the other thereby providing phase reference.

By proper choice of flux density the gap between the armature and the pole pieces of the stator may be made extremely small, and the response of the pickoff made almost exactly linear with respect to the angle through which the gimbal is rotated. That is to say, for small angles of displacement, $\sin \theta \cong \theta$. To attain this requirement, and to provide equal output for both sides of the pickoff requires careful setting of the gap at each side of the pickoff and means are therefore provided for micrometric adjustment of the armature.

Turning to Fig. 4 it will be seen that while one side of the clamping block 27 is abutted with the post 29, the other side is spaced away therefrom, as indicated at 36. Consequently upon tightening the screw 28 individual to the gap 36 the head 24 may be rotated a minute amount, e. g. as shown by angle C, to effect adjustment of the gaps of the pickoff. Such result is made possible by fabricating the post 29 of material which is penetrable by the head 24 so that, in effect, the latter is forced into the post. It will be understood that provision is made for a coarse adjustment of the gaps, e. g., by axial movement of the coils by means of the screw attaching the bracket 32 or otherwise, and that the fine adjustment described in connection with Fig. 4 is of a micrometric nature only.

If it is desired to incorporate the fundamentals of the invention in an instrument for sensing the forces and hence the rate of angular displacement about two axes simultaneously the embodiment of Fig. 5 may be resorted to. In this figure the rotor 52 is supported in a housing or gimbal 53, here illustrated for convenience as spherical, and the latter is carried on torsionally deformable members 54—54 and 55—55. In this case the invention is arranged for sensing the rate of angular displacement simultaneously about two axes which are positioned in the same plane, and that plane may correspond to the mid-plane transverse to the rotor axis. However torsional deformability of one pair, e. g. 55—55 must correspond to lateral deflection of the other pair 54—54, and vice versa. In such applications the respective spring constants are selected to yield torsional action about a selected axis accompanied by the necessary lateral rigidity, regardless of the pair of supports then in action.

From the foregoing it will have been comprehended that the invention is not to be regarded as limited to the support of the single gimbal, i. e. housing, of a rate gyroscope on its frame, but is capable of being embodied in the mounting of one gimbal upon another, e. g. as shown in Fig. 6 in which a gimbal ring 41 upon which the rotor 42 is carried is, in turn, supported on another gimbal ring 43. The supports 44—44 between the two gimbals and the supports 45—45 between the ring 43 and the framework 46 are constructed in accordance with the principles of the invention, i. e. characterized by torsional deformability in the direction of angular movement and stiffness in the direction of lateral displacement.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

Having thus described our invention, what we claim and desire to secure by Letters Patent is:

1. A gyroscope comprising a framework, a gimbal, a rotor mounted in said gimbal, means for rotating said rotor, and means for supporting said gimbal on said framework, including a pair of primarily torsionally deformable axially aligned rods of cruciform cross-section respectively secured at their ends between said gimbal and framework at opposite sides thereof.

2. A gyroscope in accordance with claim 1 further characterized by an electrical pickoff, including a fixed part and a movable part, the movable part of the pickoff being secured to one side of the gimbal and the fixed part thereof being secured to the framework.

3. A gyroscope comprising a framework, a gimbal, a rotor mounted in said gimbal, means for rotating said rotor, and means for supporting said gimbal for limited angular displacement about an axis perpendicular to the axis of the rotor comprising a pair of coaxial members positioned at opposite sides of the gimbal, each said member having an enlargement at one end and a shank at the other, said gimbal having means for clamping said enlargement and said framework having means for clamping said shank, said members having a portion of cruciform transverse cross-section intermediate said enlargement and shank which is torsionally deformable in a predetermined degree depending upon the torque applied to displace the housing about the axis of said members, said enlargement providing portions for adapting said reduced portions to a clamping type of mounting of practical proportions.

References Cited in the file of this patent

UNITED STATES PATENTS

| | | |
|---|---|---|
| 2,069,911 | Bourdon | Feb. 9, 1937 |
| 2,484,823 | Hammond | Oct. 18, 1949 |